and Patent [19]

Klazinga

[11] Patent Number: 4,874,730
[45] Date of Patent: Oct. 17, 1989

[54] PROCESS FOR THE PREPARATION OF MODIFIED ZEOLITES

[75] Inventor: Aan Hendrik Klazinga, Amsterdam, Netherlands

[73] Assignee: Shell Oil Company, Houston, Tex.

[21] Appl. No.: 180,747

[22] Filed: Apr. 12, 1988

[30] Foreign Application Priority Data

Apr. 14, 1987 [GB] United Kingdom ............... 8708962

[51] Int. Cl.$^4$ ............................................. B01J 29/08
[52] U.S. Cl. ....................................... 502/61; 502/66; 502/74; 502/79
[58] Field of Search ................... 502/61, 66, 74, 79

[56] References Cited

U.S. PATENT DOCUMENTS

| | | | |
|---|---|---|---|
| 3,455,842 | 7/1969 | Cornelius et al. | 252/455 |
| 3,583,903 | 6/1971 | Miale et al. | 502/61 |
| 3,806,437 | 4/1974 | Franse et al. | 204/190 |
| 4,304,686 | 12/1981 | Telford | 502/61 |
| 4,357,265 | 11/1982 | Chiang | 252/455 Z |

*Primary Examiner*—Carl F. Dees

[57] ABSTRACT

Process for the preparation of a modified zeolite of the Y-type by treatment with a solution of a metal salt and a calcination which comprises treating a zeolite of the Y-type having an alkali oxide/aluminium oxide molar ratio of at most about 0.13 with a solution of a multivalent metal salt having a cationic radius between about 0.6 and about 1.0Å and converting it by calcination into a product having a unit cell size between about 24.21Å and about 24.65Å.

17 Claims, No Drawings

PROCESS FOR THE PREPARATION OF MODIFIED ZEOLITES

FIELD OF THE INVENTION

The present invention relates to a process for the preparation of modified zeolites and zeolites thus prepared. The zeolites produced in accordance with the present invention can be used as catalyst carriers and/or as catalysts in various fields such as hydroprocessing and catalytic cracking, in particular in various hydrocracking processes.

BACKGROUND OF THE INVENTION

The use of zeolites as catalysts and/or catalyst carriers has long been recognized and many methods to improve zeolitic base materials have been reported in the art. In the early days of zeolite research and development much attention has been devoted to physically changing the nature and possibly the properties of zeolitic base materials, e.g. by calcining under so-called selfsteaming conditions or by wet calcination. Also the treatment with ammonium-ions in various stages of the zeolite preparation procedures has been reported extensively.

It has also been reported that zeolites can be modified by treating them with certain metal salt solutions, or even with metal salts themselves, in combination with various pre- and after-treatments to ensure that the zeolites are produced in the most active form.

It has now been found that zeolites of the Y-type with interesting properties can be produced by modifying low alkali oxide-containing zeolites with certain metal salts followed by a calcination treatment. The zeolites thus prepared are of importance in the preparation of catalysts, in particular in the preparation of hydrocracking catalysts.

SUMMARY OF THE INVENTION

This invention relates to a process for the preparation of modified zeolites of the Y-type by treatment with a solution of a metal salt and a calcination which comprises treating a zeolite of the Y-type having an alkali oxide/aluminium oxide molar ratio of at most about 0.13 with a solution of a multi-valent metal salt having a cationic radius between about 0.6 and about 1.0 Å and converting it by calcination into a product having a unit cell size between about 24.21 and about 24.65 Å.

DESCRIPTION OF THE PREFERRED EMBODIMENTS

Zeolites of the Y-type having an alkali oxide/aluminium oxide molar ratio of at most about 0.13 and in particular a sodium oxide content of at most about 2% by weight can suitably be obtained from high alkali oxide containing Y-zeolites by treatment in one or several stages with an ammonium salt solution to reduce the amount of alkali metal to the desired level. Commercially available zeolites, such as Na-Y can be suitably applied as starting materials. Normally, Na-Y zeolites can contain up to about 13.5% by weight of sodium oxide. The treatment(s) with an ammonium salt such as ammonium chloride or ammonium sulfate are well known to those skilled in the art.

It should be noted that the process according to the present invention provides a method for directly converting a low alkali oxide-containing zeolite Y into a zeolite Y having a low unit cell size by treating it with a solution of a multi-valent metal salt having a cationic radius between about 0.6 and about 1.0 Å followed by final calcination.

Examples of multi-valent cations which suitably are present in the salts to be used in the process according to the present invention comprise $Ag^+$, $Ag^{2+}$, $Bi^{3+}$, $Bi^{5+}$, $Ca^{2+}$, $Cd^{2+}$, $Ce^{4+}$, $Co^{2+}$, $Co^{3+}$, $Cr^{3+}$, $Cu^+$, $Cu^{2+}$, $Fe^{2+}$, $Fe^{3+}$, $Ga^{3+}$, $In^{3+}$, $In^{4+}$, $Ir^{4+}$, $Mg^{2+}$, $Mn^{2+}$, $Mn^{3+}$, $Mn^{4+}$, $Mo^{2+}$, $Pb^{4+}$, $Pd^{2+}$, $Pd^{4+}$, $Pt^{2+}$, $Pt^{4+}$, $Re^{4+}$, $Rh^{3+}$, $Ru^{4+}$, $Sn^{2+}$, $Sn^{4+}$, $Ta^{5+}$, $Ti^{2+}$, $Ti^{3+}$, $Ti^{4+}$, $Tl^{3+}$, $V^{3+}$, $V^{5+}$, $W^{4+}$, $W^{6+}$ and $Zn^{2+}$. Preference is given to the use of metal salts having cationic radii between about 0.60 and about 0.80 Å, in particular, to the appropriate salts of gallium, iron, copper, magnesium, cobalt and nickel. Good results have been obtained using gallium, iron and nickel salts, in particular, with gallium salts. Salts which can be suitably applied comprise inorganic salts such as nitrates and sulfates as well as the appropriate halides. Preference is given to the use of nitrates and chlorides and, in particular, to nitrates because of their water solubility which faciltates handling of the materials concerned. It is also possible to use (slightly) soluble salts of organic acids such as formates, acetates and propionates. If desired, mixtures of two or more metal salts can be used in the process according to the present invention.

The amount of metal salts to be used can be varied between wide ranges, depending to some extent on the nature of the metal applied. Normally, solutions containing between about 0.005 and about 2.0 moles of metal salt per liter water can be suitably applied, with preference being given to concentrations between about 0.01 and about 1.0 mole per liter.

The starting zeolite Y material containing at most an alkali oxide/aluminium oxide molar ratio of about 0.13 (which may have been obtained by an ion-exchange treatment of a zeolite Y containing a higher amount of alkali oxide) is normally subjected to an ion-exchange treatment with a solution containing the appropriate metal salt(s). The treatment may be carried out by any technique known in the art. If desired, the treatment may be repeated a number of times.

The treatment is normally carried out at a relatively low temperature, e.g. at temperatures between about 10° C. and about 95° C. Good results have been obtained by carrying the ion-exchange at a temperature between about 20° C. and about 95° C. It will normally be carried out during a time between about 15 minutes and about 24 hours. Preference is given to a treatment time between 30 minutes and 6 hours.

By using the process according to the present invention, zeolitic base materials having a unit cell size between about 24.21 and about 24.65 Å can be suitably produced which have substantially the crystallinity performance of the starting zeolite Y, and sometimes an even higher crystallinity compared with the starting material. Normally, materials having a crystallinity of less than about 60% of the starting material are not of great interest.

After the treatment with the appropriate metal-ion salt solution the materials thus treated will be normally subjected to drying before final calcination. Drying is normally achieved by gentle heating of the material concerned at a temperature ranging from ambient to about about 200° C. The drying procedure may be carried out in air or by using an inert gas such as nitrogen.

Partial drying is also possible depending on the type of final calcination to be applied.

The final calcination is normally performed at temperatures between about 350° C. and about 800° C. Preference is given to a calcination temperature between about 500° C. and about 750° C., in particular between about 575° C. and about 725° C. The calcination can be performed with materials which have been dried substantially, in which case it is preferred to perform the calcination in the presence of added steam, or with materials which have been partially dried. In this latter case the addition of steam may not be necessary depending on the properties of the final material envisaged. Preferably, the process according to the present invention is carried out in such a way that the product after calcining has a unit cell size between about 24.21 Å and about 24.40 Å.

The calcination time way vary between wide ranges, from less than about 30 minutes to up to about 24 hours, depending predominantly on the properties of the zeolite Y as envisaged. Good results have been obtained by using calcining times of about 1 to about 2 hours at temperatures between about 575° C. and about 725° C.

The zeolites as modified by the process according to the present invention can be used either as catalyst carriers or as catalysts; either as such or in the form of one or more metal-bearing compositions. The zeolites as produced in accordance with the present invention are particularly useful in certain hydroprocessing areas, in particular, in hydrocracking. Suitable hydrocracking catalysts comprise one or more zeolites produced in accordance with the present invention together with a binder and one or more metals having hydrogenating activities. Binders such as silica, alumina, silica-alumina, clays, zirconia, silica-zirconia and silica-boria can be suitably applied. Alumina is a preferred binder. Suitably about 10–95% of binder can be used in the compositions according to the present invention. Preferably, about 10–15% of binder is used in the present compositions.

The present invention further relates to catalyst compositions comprising a modified zeolite, a binder and at least one hydrogenation component of a Group VI metal and/or at least one hydrogenation component of a Group VIII metal. Suitably, the catalyst compositions according to the present invention comprise one or more components of nickel and/or cobalt and one or more components of molybdenum and/or tungsten, or one or more components of platinum and/or palladium.

The amount(s) of hydrogenation component(s) in the catalyst compositions suitably range between about 0.05 and about 10% by weight of Group VIII metal component(s) and between about 2 and about 40% by weight to Group VI metal component(s), calculated as metal(s) per 100 parts by weight of total catalyst. The hydrogenation components in the catalyst compositions may be in the oxidic and/or the sulfidic form. If a combination of at least a Group VI and a Group VIII metal component is present as (mixed) oxides, it will be normally subjected to a sulfiding treatment prior use in a hydrocracking process.

Feedstocks which can be suitably subjected to a hydroconversion process using catalysts based on zeolites produced in accordance with the present invention comprise gas oils, deasphalted oils, coker gas oils and other thermally cracked gas oils and syncrudes, optionally originating from tar sands, shale oils, residue upgrading processes or biomass. Combinations of various feedstocks can also be applied.

It may be desirable to subject part or all of the feedstock to one or more (hydro)treatment steps prior to its use in the hydroconversion process. It is often found convenient to subject the feedstock to a (partial) hydrotreatment. When rather heavy feedstocks are to be processed it may be advantageous to subject such feedstocks to a (hydro)demetallization treatment.

Suitable process conditions for the hydroconversion process comprise temperatures in the range from about 250° C. to about 500° C., pressures of up to about 300 bar and space velocities between about 0.1 and about 10 kg feed per liter of catalyst per hour (kg/l.h). Gas/feed ratios between about 100 and about 5000 Nl/kg feed can suitably be used. Preferably, the hydroconversion process is carried out at a temperature between about 300° C. and about 450° C., a pressure between about 25 and about 200 bar and a space velocity between about 0.2 and about 5 kg feed per liter of catalyst per hour. Preferably, gas/feed ratios between about 250 and about 2000 Nl/kg are applied.

The present invention will now be described by means of the following examples which are intended to illustrate the invention and are not to be construed as limiting the invention.

EXAMPLE 1

A crystalline alumino-silicate commercially available as LZ-Y-82 having a typical sodium oxide content of 0.2%wt and a unit cell size of 24.56 Å was subjected to an ion-exchange treatment with a solution (10 ml per gram of crystalline alumino-silicate) of 0.2M gallium nitrate. The ion-exchange treatment was carried out for one hour at a temperature of 95° C. After filtration, the product obtained was washed and subjected to a drying procedure at 120° C. during 16 hours. Thereafter the product was subjected to a calcination procedure in the presence of steam for a period of one hour at 600° C. The crystalline alumino-silicate obtained contained a substantial amount of gallium. The unit cell size of the material thus obtained amounted to 24.36 Å. The crystallinity of the material obtained was at least 72% of that of the starting material (uncorrected for the presence of gallium).

EXAMPLE 2

The procedure as described in Example 1 was repeated using a calcination temperature of 700° C. The crystalline alumino-silicate obtained contained a substantial amount of gallium. The unit cell size of the material thus obtained amounted to 24.24 Å. The crystallinity of the material obtained was at least 66% of that of the starting material (uncorrected for the presence of gallium).

EXAMPLE 3

The procedure as described in Example 2 was repeated using an ion-exchange treatment with 0.05M gallium nitrate which was applied twice. The unit cell size of the material thus obtained amounted to 24.25 Å. The crystallinity of the material obtained was at least 71% of that of the starting material (uncorrected for the presence of gallium).

EXAMPLE 4

The procedure as described in Example 2 was repeated using 0.05M iron(III) nitrate. The unit cell size of the material thus obtained amounted to 24.30 Å. The crystallinity of the material obtained was at least 75% of that of the starting material (uncorrected for the presence of iron).

EXAMPLE 5

The procedure as described in Example 4 was repeated using iron(III) chloride. The unit cell size of the material thus obtained amounted to 24.28 Å. The crystallinity of the material obtained was at least 79% of that of the starting material (uncorrected for the presence of iron).

EXAMPLE 6

The procedure as described in Example 2 was repeated using 0.05M copper(II) nitrate. The unit cell size of the material thus obtained amounted to 24.32 Å. The crystallinity of the material obtained was at least 83% of that of the starting material.

EXAMPLE 7

The procedure as described in Example 2 was repeated using 0.1M nickel nitrate. The unit cell size of the material thus obtained amounted to 24.33 Å. The crystallinity of the material obtained was at least 80% of that of the starting material.

What is claimed as the invention is:

1. A process for the preparation of a modified Y zeolite by treatment with a solution of a metal salt and a calcination which comprises treating a Y zeolite having an alkali oxide/aluminum oxide molar ratio not greater than about 0.13 with a solution of a multi-valent metal salt having a cationic radius between about 0.6 and about 1.0 Å and converting it by calcination into a product having a unit cell size between about 24.21 Å and about 24.65 Å.

2. The process of claim 1 wherein said Y zeolite is obtained by subjecting a high sodium oxide containing Y zeolite to a treatment with an ammonium compound.

3. The process of claim 1 wherein said solution of said multi-valent metal ion has a cationic radius between about 0.60 Å and about 0.80 Å.

4. The process of claim 3 wherein said multi-valent metal salt is selected from the group consisting of gallium, iron, copper, magnesium, cobalt, nickel and mixtures thereof.

5. The process of claim 4 wherein said multi-valent metal salt is a gallium salt.

6. The process of claim 1 wherein said multi-valent metal is selected from the group consisting of a nitrate, a chloride and mixtures thereof.

7. The process of claim 1 wherein said solution of said multi-valent metal salt has a molarity between about 0.005 and about 2.

8. The process of claim 7 wherein said solution of a multi-valent metal salt has a molarity between about 0.01 and about 1.

9. The process of claim 1 wherein said treatment with said multi-valent metal salt solution is carried out at a temperature between about 10° C. and about 95° C.

10. The process of claim 1 wherein the treated zoelite is subjected to a drying treatment at a temperature up to about 200° C.

11. The process of claim 1 wherein the treated zeolite is subjected to a final calcination at a temperature between about 350° C. and about 800° C.

12. The process of claim 11 wherein the final calcination is carried out at a temperature between about 575° C. and about 725° C.

13. The process of claim 11 wherein, following the final calcination, a modified zeolite product having a unit cell size of between about 24.21 Å and about 24.40 Å is obtained.

14. A catalytically active composition comprising a zeolite having a unit cell size about 24.21 Å and about 24.40 Å prepared by the process of claim 1, and a binder.

15. The composition of claim 14 wherein said composition additionally contains at least one hydrogenation component of a Group VI metal, at least one hydrogenation component of a Group VIII metal or mixtures thereof.

16. The composition of claim 15 wherein said composition comprises one or more components selected from the group consisting of nickel, cobalt and mixtures thereof, and one or more components selected from the group consisting of molybdenum, tungsten and mixtures thereof.

17. The composition of claim 15 wherein said composition comprises one or more components selected from the group consisting of nickel, cobalt and mixtures thereof and one or more components selected from the group consisting of platinum, palladium and mixtures thereof.

* * * * *